(12) United States Patent
Nishitani

(10) Patent No.: US 8,235,565 B2
(45) Date of Patent: Aug. 7, 2012

(54) VEHICULAR LAMP

(75) Inventor: Norihiro Nishitani, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 65 days.

(21) Appl. No.: 12/962,852

(22) Filed: Dec. 8, 2010

(65) Prior Publication Data

US 2011/0141752 A1 Jun. 16, 2011

(30) Foreign Application Priority Data

Dec. 10, 2009 (JP) ................................. 2009-280846

(51) Int. Cl.
*G01B 21/22* (2006.01)
(52) U.S. Cl. ......... 362/460; 362/462; 362/523; 362/529
(58) Field of Classification Search .................. 362/460, 362/462, 523, 529, 531, 532
See application file for complete search history.

(56) References Cited

U.S. PATENT DOCUMENTS

| 5,678,915 | A  | * | 10/1997 | Shirai et al. ................... | 362/460 |
| 6,086,231 | A  | * | 7/2000  | Kenjo et al. .................... | 362/507 |
| 6,511,215 | B2 | * | 1/2003  | Hashigaya ..................... | 362/515 |
| 7,500,768 | B2 | * | 3/2009  | Chen .............................. | 362/460 |
| 7,556,409 | B2 | * | 7/2009  | Tatara et al. ................... | 362/465 |
| 7,645,060 | B2 | * | 1/2010  | Andre et al. ................... | 362/505 |
| 7,658,523 | B2 | * | 2/2010  | Sugimoto ...................... | 362/526 |
| 2001/0036080 | A1 | * | 11/2001 | Shirai ........................... | 362/460 |

FOREIGN PATENT DOCUMENTS

JP 2000-195326 A 7/2000

OTHER PUBLICATIONS

English abstract of JP2000195326 published on Jul. 14, 2000, espacenet database, 1 page.

* cited by examiner

*Primary Examiner* — Ali Alavi
(74) *Attorney, Agent, or Firm* — Osha Liang LLP

(57) ABSTRACT

A vehicular lamp includes a first aiming mechanism and a second aiming mechanism that enable a lamp unit to be assembled to a vehicle body from the outside or the inside. The lamp body includes a pair of first vertical tilt axis structural members that are provided on a rear portion and engage with the vehicle body tiltably around a first horizontal tilt axis, and a pair of second vertical tilt axis structural members that are provided on both left and right sides and retained tiltably around a second horizontal tilt axis with respect to the vehicle body. The first aiming mechanism has a first optical axis adjusting portion that tilts the lamp unit around the first horizontal tilt axis via an aiming screw. The second aiming mechanism has a second optical axis adjusting portion that tilts the lamp unit around the second horizontal tilt axis via an aiming screw.

19 Claims, 5 Drawing Sheets

VEHICULAR LAMP

BACKGROUND OF INVENTION

1. Field of the Invention

The present invention relates to a vehicular lamp in which a lamp unit pivots vertically by an aiming mechanism.

2. Related Art

Patent Document 1 describes a movable unit type vehicular headlamp (see FIGS. 1, 3, 5, 6 of Patent Document 1). The vehicular headlamp in Patent Document 1 is such that a lamp unit in which a front lens is mounted to a lamp body provided with a reflector and a bulb that is a light source on the inside is tiltably supported about a horizontal tilt axis by a pair of left and right axial supporting portions of a lamp housing that surrounds the unit in a U-shape. Also, the lamp unit is tilt-adjusted about the horizontal tilt axis by turning an aiming screw that is arranged between a horizontal arm that extends horizontal to a back surface side of the lamp body and a horizontal step portion of the lamp housing, such that an optical axis is tilt-adjusted in the vertical direction.

Also, a unit U is mounted on a vehicle body by bolting the lamp housing that supports it to a bumper that is part of the vehicle body.

[Patent Document 1] Japanese Patent Application Laid-Open (Kokai) No. JP-A-2000-195326.

SUMMARY OF INVENTION

The lamp unit in Patent Document 1 is attached to the vehicle body from the rear of the bumper via a bracket. However, the movable type lamp unit that is tilt-adjusted by the aiming mechanism may need to be directly attached to the vehicle body from the front of the vehicle body, depending on the type of vehicle. Regarding this, the lamp unit in Patent Document 1 is unable to be attached directly to the vehicle body from the front of the vehicle body without a bracket, so the type of vehicle to which it can be employed is limited. Therefore, it was necessary to prepare a lamp unit having an entirely different attaching structure for a type of vehicle to which it attaches to the vehicle body from the front. This increased costs due to an increase in the number of parts and the need to prepare separate molds, as well as led to an increase in the complexity of management due to the increase in the number of parts.

In one or more embodiments, the vehicular lamp of the present invention provides a vertically aim-adjustable vehicular lamp that has a common attaching structure capable of attachment from either the front or the rear of a vehicle body.

In one or more embodiments, the vehicular lamp according to one or more embodiments is a vehicular lamp that includes a lamp body; a front cover integrated with the lamp body; a lamp unit disposed within the lamp body and covered by the front cover; and a first aiming mechanism and a second aiming mechanism that enable the lamp unit to be assembled to a vehicle body from outside of the vehicle body or inside of the vehicle body. The lamp body comprises a pair of first vertical tilt axis structural members provided on a rear portion of the lamp body, and a pair of second vertical tilt axis structural members provided on both left and right sides of the lamp body. The pair of first vertical tilt axis structural members engage with the vehicle body tiltably around a first horizontal tilt axis, and the pair of second vertical tilt axis structural members are retained tiltably around a second horizontal tilt axis with respect to the vehicle body. The first aiming mechanism comprises a first optical axis adjusting portion that tilts the lamp unit around the first horizontal tilt axis by an aiming screw being interposed in between, and the second aiming mechanism comprises a second optical axis adjusting portion that tilts the lamp unit around the second horizontal tilt axis by an aiming screw being interposed in between.

(Operation) The lamp unit is able to be assembled in a vertically aimable state from the outside of the vehicle body via the pair of first vertical tilt axis structural members provided on the rear of the lamp body. Further, the lamp unit is able to be assembled to the vehicle also from the rear of the vehicle body via the pair of second vertical tilt axis structural members provided on both the left and right side portions of the lamp body. As a result, the shape of the lamp body can be made common with both a type of vehicle in which the lamp unit attaches from the outside of the vehicle body (hereinafter, referred to as an external attachment type of vehicle), and a type of vehicle in which the lamp unit attaches from the inside of the vehicle body (hereinafter, referred to as an internal attachment-type type of vehicle).

Also, one or more embodiments are structured such that, in the vehicular lamp as described above, the second vertical tilt axis structural members are tiltably retained by a bracket that is fixed to the vehicle body.

(Operation) The lamp unit is tiltably retained by the bracket via the second vertical tilt axis structural members, and moreover, is fixed to the vehicle body from the inside via the bracket.

Also, one or more embodiments are structured such that, in the vehicular lamp as described above, the second optical axis adjusting portion is formed able to be shared with the first optical axis adjusting portion.

(Operation) The manufacturing costs of the lamp body can be reduced by integrating the optical axis adjusting portions and further simplifying the shape of the lamp body.

One or more embodiments are structured such that, in the vehicular lamp as described above, the first optical axis adjusting portion or the second optical axis adjusting portion has a turning operation portion configured such that the aiming screw is able to be turned by a tool abutted therewith from the front of the vehicle body.

(Operation) Aiming adjustment of the lamp unit is made possible by abutting a tool from the front of the vehicle body and turning the aiming screw.

One or more embodiments are structured such that, in the vehicular lamp as described above, the turning operation portion has an underneath turning operation portion configured to be able to be turned by a tool abutted therewith from below the vehicle body.

(Operation) Aiming adjustment of the lamp unit is made possible by abutting a tool from underneath the vehicle body and turning the aiming screw.

According to the vehicular lamp according to one or more embodiments, the shape of the lamp body is made common between an external attachment type of vehicle and an internal attachment type of vehicle. As a result, the mold can be shared and the number of parts that need to be managed decreases, so the cost can be reduced and part management is easier.

According to the vehicular lamp according to one or more embodiments, a lamp body (a lamp unit) that can be attached to the vehicle body from the outside of the vehicle body via the first vertical tilt axis structural members can be attached to the vehicle body also from the inside of the vehicle body via the bracket and the second vertical tilt axis structural members, and the mold of the lamp body can be shared, so manufacturing costs of the vehicular lamp can be reduced.

According to one or more embodiments, manufacturing costs of the lamp body that include the mold-making cost can be reduced by simplifying the lamp body shape.

According to one or more embodiments, aiming adjustment of the lamp unit can be performed from the front of the vehicle body with the lamp unit still assembled to the vehicle body.

According to one or more embodiments, aiming adjustment of the lamp unit can be performed in a type of vehicle that requires that aiming adjustment of the lamp unit be performed from underneath the vehicle body.

Other aspects and advantages of the invention will be apparent from the following description, the drawings and the claims.

DETAILED DESCRIPTION

Figure 1A:
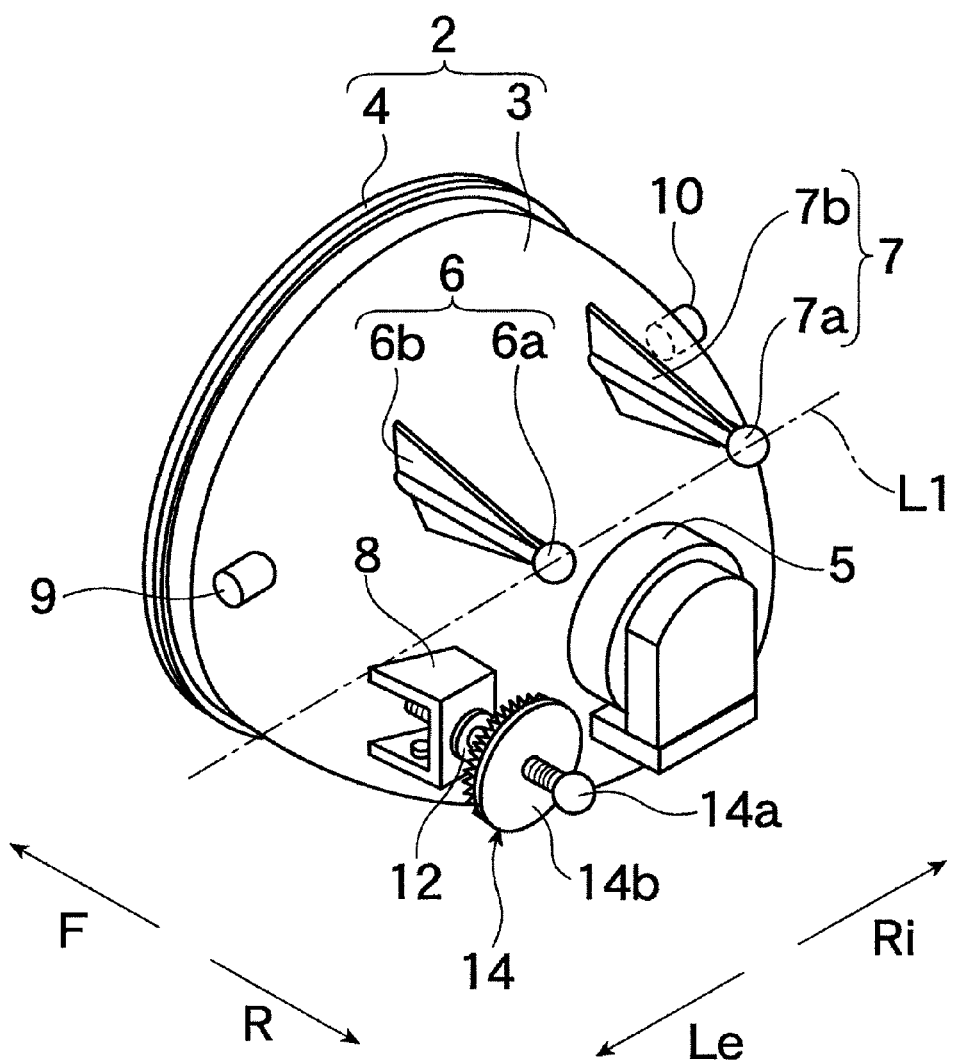
FIG. 1A is a perspective view as viewed from the rear of a lamp unit of a vehicular lamp of one or more embodiments.
Figure 1B:
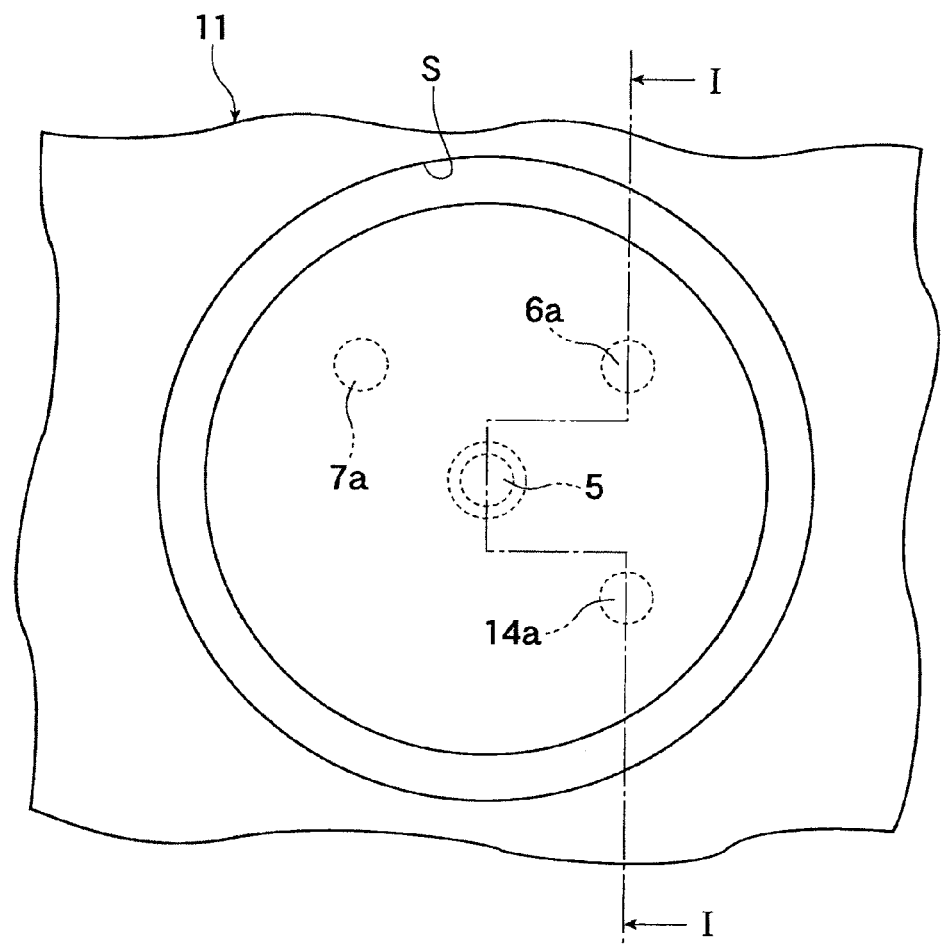
FIG. 1B is a front view of a vehicle body to which the lamp unit is attached.

Next, embodiments of the present invention will be described with reference to FIG. 1A to FIG. 6.

First, a first aiming mechanism 110 in which a lamp unit 2 is mounted to a vehicle body 11 from the front of the vehicle body (the outside of the vehicle body) will be described with reference to FIGS. 1A to 3. The first aiming mechanism 110 is formed by first tilt axis structural members 6, 7 provided on rear portions 3a, 3b of a lamp body 3 of the lamp unit 2, and an optical axis adjusting portion 8 in which an aiming screw 14 is rotatably attached such that a rotational axis becomes substantially parallel to the vehicle body longitudinal direction.

Figure 2:
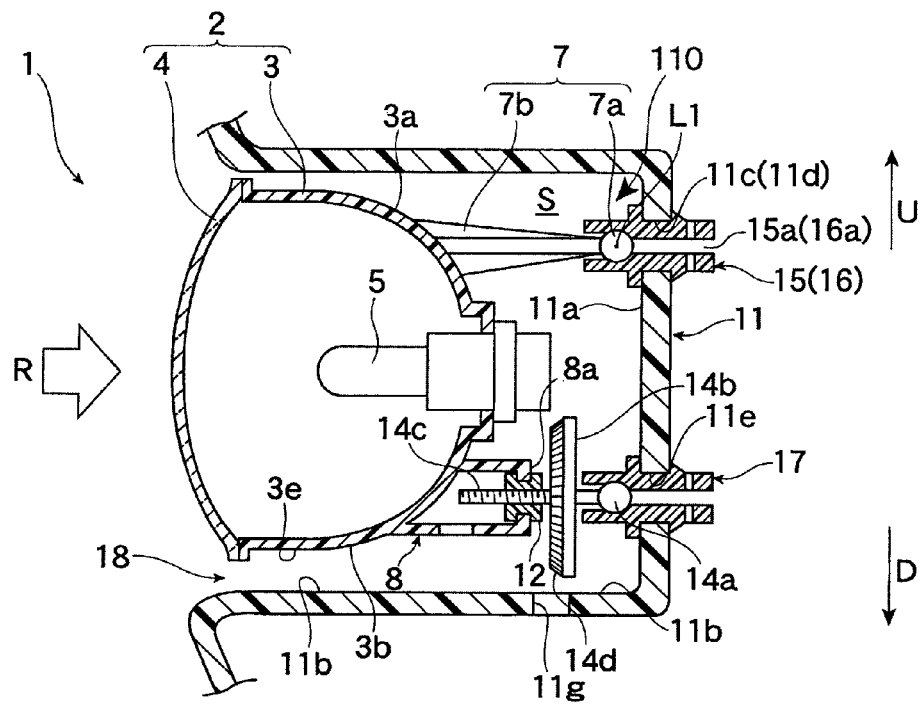
FIG. 2 is a cross sectional view taken along I-I of FIG. 1B, showing a state in which the lamp unit is attached to an external attachment-type type of vehicle.

FIG. 1A and FIG. 2 show the lamp unit 2 of a vehicular lamp 1 of one or more embodiments of the present invention that is formed aim-adjustable. The lamp unit 2 is a fog lamp or the like, and is formed by a resin lamp body 3 with a bulb 5 that serves as a light source fitted in the center inside, and a transparent or semi-transparent front lens 4 inserted into a front open portion of the lamp body 3. In the description below, the direction of reference numeral F in FIG. 1A to FIG. 6 will be described as the front of the vehicle body (i.e., the outside of the vehicle body), the direction of reference numeral R will be described as the rear of the vehicle body (i.e., the inside of the vehicle body), reference numeral U will be described as above the vehicle body, reference numeral D will be described as below the vehicle body, the direction of reference numeral Le will be described as the left of the vehicle body, and the direction of reference numeral Ri will be described as the right of the vehicle body.

The pair of left and right first tilt axis structural members 6, 7 are provided protruding out toward the rear of the vehicle body on an upper portion 3a of the rear outer peripheral surface of the lamp body 3, and the generally sideways U-shaped, as viewed from the side, optical axis adjusting portion 8 that is provided protruding out toward the rear of the vehicle body is provided on a lower portion 3b of the rear outer peripheral surface of the lamp body 3 sandwiched in between. Also, a pair of cylindrical pin-shaped second tilt axis structural members 9, 10 is formed protruding out to the left and right on left and right side outer peripheral surfaces 3c, 3d (see FIG. 5) of the lamp body 3.

The first tilt axis structural members 6 and 7 have ball portions 6a, 7a integrally formed on rear ends of arms 6b, 7b that protrude out toward the rear of the vehicle body. Also, a nut member 12 that has a female screw portion 12a that passes longitudinally through a surface 8a that faces a front attaching surface 11a of the vehicle body 11 is fixed to the optical axis adjusting portion 8. The nut member 12 is fixed in a rotation stopping fashion to the optical axis adjusting portion 8 by, for example, engaging an engagement portion in which the cross section in the lateral direction is formed square with an attaching hole 8c on an attaching surface 8a side also formed with a square cross section, and fixed so as not to slip out longitudinally by forming the longitudinal cross section in an H-shape.

Also, reference numeral 14 denotes an aiming screw in a type of vehicle in which the lamp unit 2 attaches to the vehicle body from the front of the vehicle body (the outside of the vehicle body). The aiming screw 14 has a ball portion 14a at a rear end portion, a turning operation portion 14b at a center portion, and a male screw portion 14c at a tip portion. When attaching the lamp unit 2 to an external attachment-type type of vehicle, the tip portion (the male screw portion 14c) of the aiming screw 14 is screwed into the female screw portion 12a of the nut member 12 in advance.

An attachment method in a type of vehicle in which the lamp unit 2 is attached to the vehicle body from the front of the vehicle body (the outside of the vehicle body) will be described with reference to FIG. 2.

An external attachment-type vehicle body 11 (a bumper or the like) that is the attachment target includes a lamp unit housing chamber S with a longitudinal cross section that is indented in a sideways U-shape toward the rear of the vehicle body, and a forward facing surface that serves as the attaching surface 11a of the lamp unit 2. Attaching holes 11c to 11e are provided in positions corresponding to the first tilt axis structural members 6, 7 and the aiming screw 14 that is screwed into the optical axis adjusting portion 8, in the attaching surface 11a. Resin self-locking nuts 15 to 17 are fixed to the attaching holes 11c to 11e.

The rear end portions of the self-locking nuts 15 to 17 are formed having an outer shape that enables them to be inserted into the attaching holes 11c to 11e, and the self-locking nuts 15 to 17 have center through-holes 15a to 17a and ball receiving portions 15b to 17b corresponding to the size of the ball portions 6a, 7a, 14a near the tip portion. Also, the self-locking nuts 15 to 17 have a barb 171 that slopes downward from the front to the rear provided on the outer periphery of the center portions thereof, and a flange portion 172 formed in front by the amount of the plate thickness of the attaching surface 11a from the front of the bath. The self-locking nuts 15 to 17 are fixed so as not to slip out longitudinally by, for example, press-fitting them into the attaching holes 11c to 11e from the front of the vehicle body and sandwiching the attaching surface 11a between the barb and the flange. Also, the self-locking nuts 15 to 17 are fixed in a rotation stopping fashion to the attaching surface 11a by, for example, forming the engagement portion of both the attaching holes 11c to 11e and the nuts 15 to 17 in a square shape.

Attachment of the lamp unit 2 is performed by press-fitting the ball portions 6a, 7a, 14a of the first tilt axis structural members 6, 7 and the aiming screw 14 from the front (the outside) of the vehicle body 11 into the ball receiving portions 15b to 17b from the tip portions of circular holes 15a to 17a that have smaller diameters than the ball receiving portions, and engaging them, such that the lamp unit 2 is supported at three points on the vehicle body 11. Incidentally, the attaching holes 11c, 11d are formed in the attaching surface 11a such that the centers of the ball receiving portions 15b, 16b are both arranged on a substantially horizontal line when the self-locking nuts 15, 16 are fitted. As a result, the line that connects the centers of the ball portions 6a, 7a forms a first horizontal tilt axis L1, and the lamp unit 2 is retained by the vehicle body 11 in a tiltable state around the horizontal tilt axis L1 with the ball receiving portions 15b, 16b as the fulcrum. Furthermore, the lamp unit 2 tilts around the first horizontal tilt axis L1 in accordance with forward or backward movement of the optical axis adjusting portion 8 in the vehicle body longitudinal direction achieved by turning the aiming screw 14.

Figure 3:
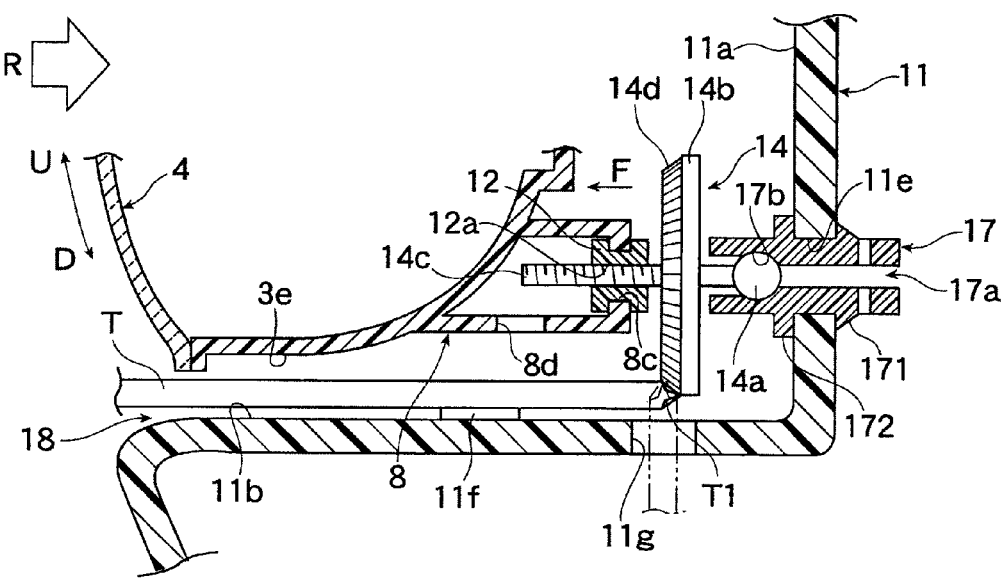
FIG. 3 is an enlarged partial cross sectional view of FIG. 2, showing aiming adjustment of the lamp unit attached to the external attachment-type type of vehicle.

A gap 18 wide enough to be able to insert a tool such as a screwdriver to turn the aiming screw 14 is provided between a lower portion 3e of the lamp body 3 and a lower surface 11b of the vehicle body as shown in FIGS. 2 and 3. A tool supporting portion 11f that protrudes upward is provided on the lower surface 11b, and a tool insertion through-hole 11g is provided below the turning operation portion 14b in the lower surface 11b. Also, an abutting portion for abutting the tip of the tool against and turning is provided on the turning operation portion 14b. The abutting portion may be formed in a variety of shapes to match the shape of the tip of the tool, but in this embodiment, a bevel gear having a beveled surface 14d that is sloped and becomes broader from the front of the vehicle body toward the rear on the outer periphery of the front edge is formed, taking into account that a Phillips-head screwdriver is used as the tool. Also, the turning operation portion 14b is such that the beveled surface 14d is formed on the outer diameter that is visible from the front of the vehicle body through the gap 18.

The aiming (tilting) adjustment of the lamp unit 2 will be described with reference to FIGS. 2 and 3. The aiming adjustment is performed by placing a tip T1 of a tool T (a Phillips-head screwdriver in this case) that has been inserted from the gap 18 and supported by the rear supporting portion 11f against the beveled surface 14d of the turning operation portion 14b, or placing it against the beveled surface 14d from below the turning operation portion 14b through the tool insertion through-hole 11g, and turning the tool from either the front or below.

When the optical axis adjusting portion 8, into which the aiming screw 14 that is turned is screwed, moves forward as a result of turning the tool one way, the lamp unit 2 tilts around the horizontal tilt axis L1 of the ball portions 6a, 7a and tilts upward, and when the optical axis adjusting portion 8 moves backward as a result of turning the tool in the opposite direction, the lamp unit 2 tilts downward.

Figure 4:
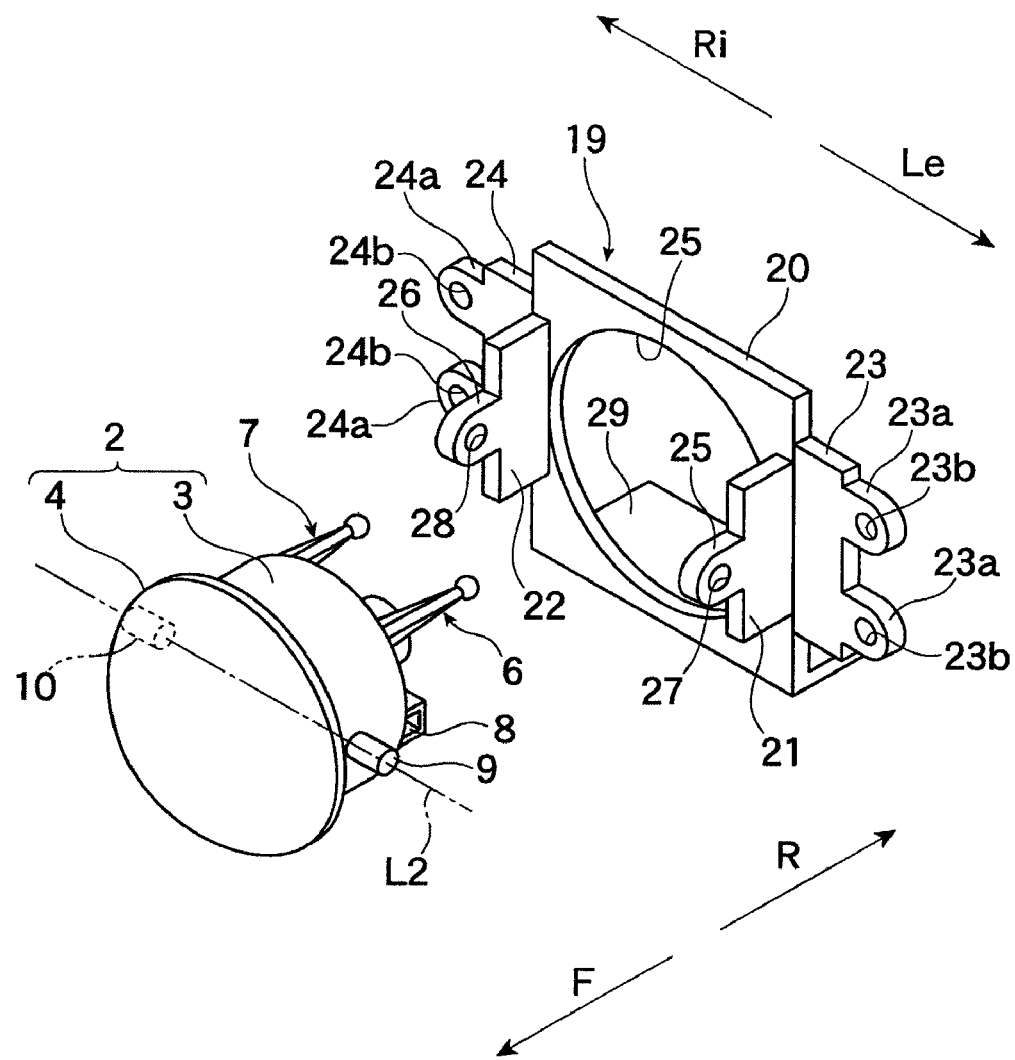
FIG. 4 is an exploded perspective view as viewed from the front of a lamp unit and a bracket for an internal attachment-type type of vehicle.
Figure 5:
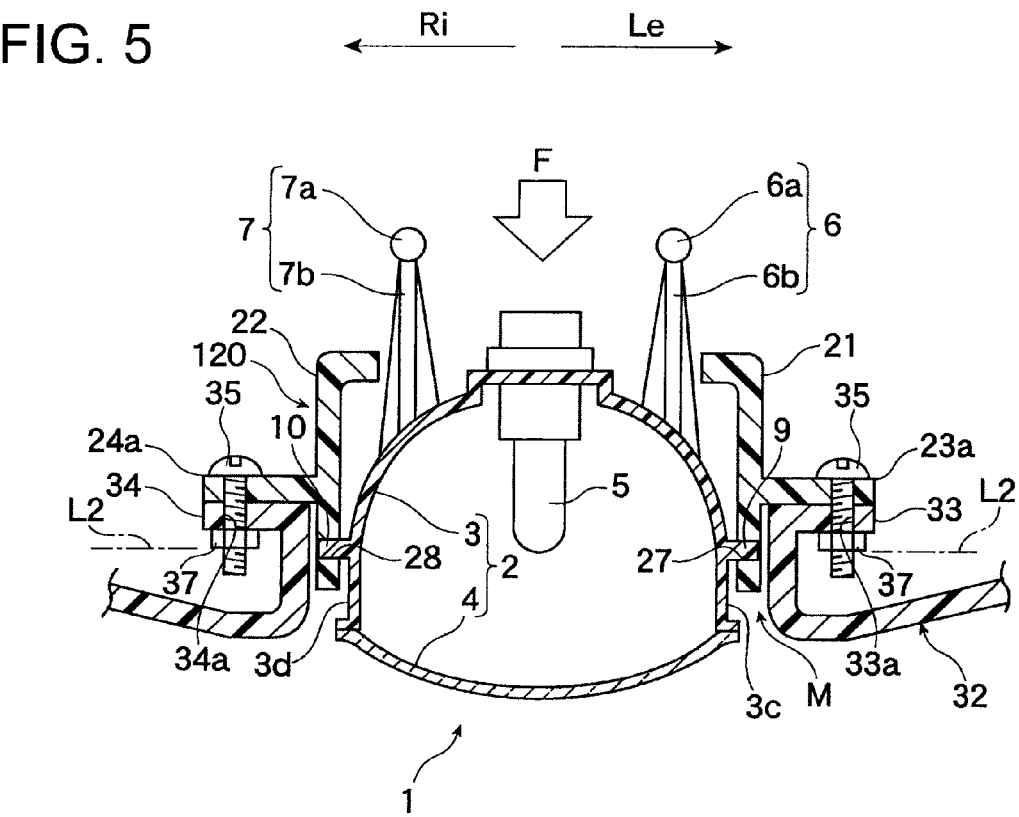
FIG. 5 is a horizontal cross sectional view of a vehicular lamp of one or more embodiments, showing a state in which the lamp unit is attached to the internal attachment-type type of vehicle via the bracket.

Next, a second aiming mechanism 120 in which the lamp unit 2 is mounted to a vehicle body 32 from the inside (the rear) of the vehicle body will be described with reference to FIGS. 4 to 6. The vehicular lamp 1 of this embodiment uses a lamp body 3 having the same shape, and is structured to be able to attach to the external attachment-type vehicle body 11 via the first aiming mechanism 110, as well as the internal attachment-type vehicle body 32 via the second aiming mechanism 120.

The second aiming mechanism 120 is formed by the second tilt axis structural members 9, 10 provided on both the left and right side portions 3c, 3d of the lamp body, a bracket 19 that is attached to the vehicle body 32 while tiltably supporting the structural members 9, 10, and the optical axis adjusting portion 8 to which the aiming screw 14 is rotatably attached such that the rotational axis is substantially parallel to the vehicle vertical direction.

A nut member 13 that has a female screw portion 13a that passes vertically through a lower surface 8b is fixed to the optical axis adjusting portion 8. The nut member 13 is fixed in a rotation stopping fashion to the optical axis adjusting portion 8 by, for example, engaging an engagement portion in which the vertical cross section is formed square with an attaching hole 8d on the lower surface 8b side also formed with a square cross section, and fixed so as not to slip out vertically by forming the vertical cross section in an H-shape.

The optical axis adjusting portion 8 doubles as the optical axis adjusting portion 8 of the first aiming mechanism by attaching the nut member 13 to the lower surface 8b instead of attaching the nut member 12 to the attaching surface 8a when used on an external attachment-type type of vehicle. However, the second optical axis adjusting portion may also be formed separately from the first optical axis adjusting portion 8.

The bracket 19 to which the lamp unit 2 is aimably attached from the rear of the vehicle body (the inside of the vehicle body) has a plate-shaped bracket body portion 20, a pair of lamp unit supporting arms 21, 22 provided protruding forward from the bracket body portion 20, and vehicle body attaching plates 23, 24 provided protruding out to the left and right of the bracket body portion 20. Also, the bracket body portion 20 has a circular hole 25 of a size that will not interfere with the outer periphery of the lamp body 3 when the lamp unit 2 is tilted provided in the center.

The arrangement spacing the pair of lamp unit supporting arms 21, 22 is substantially the same as the width of the lamp body 3, and lamp unit supporting portions 25, 26 that have circular holes 27, 28 are provided on the front ends of the supporting arms 21, 22. The inner diameters of the circular holes 27, 28 are substantially the same as the outer diameters of the second tilt axis structural members 9, 10. The lamp unit 2 is slidably supported by the lamp unit supporting arms 21, 22 by elastically expanding the lamp unit supporting portions 25, 26 laterally outward and passing the second tilt axis structural members 9, 10 through the circular holes 27, 28, respectively. As a result, the lamp unit 2 tilts around the second horizontal tilt axis L2 that passes through the centers of the circular holes 27, 28.

The lower portion of the bracket 19 has a supporting plate 29 of the aiming screw 14 provided protruding out toward the rear. Also, reference numeral 30 denotes an aiming screw. The aiming screw 30 has a male screw portion 30a at the tip, a cylindrical engagement portion 30b at a center portion that has an outer diameter substantially the same as the outer diameter of the male screw portion, a stepped portion 30c provided at a rear end of the engagement portion, and a turning operation portion 30d at a base end portion. Also, the supporting plate 29 has a through-hole 31 arranged directly below the female screw portion of the nut member 13 when the lamp unit 2 is supported by the supporting arms 21, 22.

The through-hole 31 has an inner diameter that is substantially the same as the outer diameter of the engagement portion 30b of the aiming screw.

Also, the turning operation portion 30d has a first tool receiving portion 30e that a tool can be placed against from the front of the vehicle body and turned provided on its outer periphery, and has a second tool receiving portion 30f that a tool can be placed against from below and turned provided on its lower surface. Each tool receiving portion may be formed in a variety of shapes to match the shape of the tip of the tool, but in this embodiment, a beveled surface that is sloped trailing off from above to below the vehicle as the first tool receiving portion 30e, and the second tool receiving portion 30f (a cross-shaped concave portion or the like) are each formed on the turning operation portion 30d.

The male screw portion 30a at the tip of the aiming screw 30 is inserted through the through-hole 31 and the aiming screw 30 is screwed into the female screw portion 13a of the nut member 13 until the stepped portion 30c contacts the lower surface 29a of the supporting plate 29. As a result, engagement portion 30b of the aiming screw 30 is slidably and rotatably retained by the through-hole 31. The lamp unit 2 tilts around the second horizontal tilt axis L2 with respect to the bracket 19 in response to rotation of the aiming screw 30.

Also, the vehicle body attaching plates 23, 24 of the bracket body portion 20 also each have a plurality of vehicle body attaching portions 23a, 24a provided protruding out to the left and right. Two pairs of vehicle body attaching holes 23b, 24b are provided one above the other in each of the vehicle body attaching portions 23a, 24a. The left and right attaching holes 23b, 24b are formed such that a line that passes through the center of them is parallel with the second horizontal tilt axis L2.

The internal attachment-type vehicle body 32 (such as a bumper) has a bracket attaching portion M that passes longitudinally through the vehicle body and exposes the lamp unit 2 that is supported by the bracket 19 to the front of the vehicle body. Bracket attaching plates 33, 34 that are turned back to the left and right are provided on base end portions of the attaching portion M. The attaching plates 33, 34 have two pairs of circular holes 33a, 34a one above the other formed in positions corresponding to vehicle body attaching holes 23b, 24b and such that the centers are arranged on substantially a horizontal line. The bracket 19 that tiltably supports the lamp body 2 around the second horizontal tilt axis L2 is fixed to the vehicle body 32 by aligning the vehicle body attaching portions 23a, 24a with the bracket attaching plates 33, 34 from the inside of the vehicle body 32, inserting bolts 35 through the vehicle body attaching holes 23b, 24b and the circular holes 33a, 34a, and fixing them with nuts 37. The lamp body 2 is configured to be able to tilt vertically around the second horizontal tilt axis L2 with respect to the vehicle body, with the bracket 19 fixed to the vehicle body 32.

Figure 6:
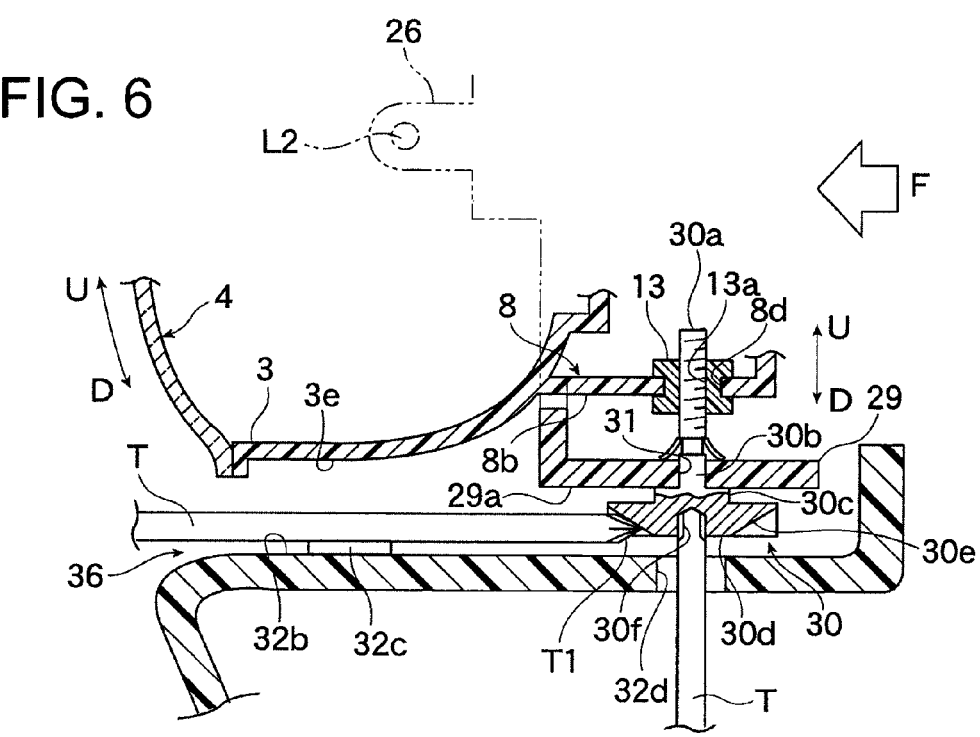
FIG. 6 is a partial longitudinal cross sectional view of the vehicular lamp in FIG. 5, showing aiming adjustment of the lamp unit attached to an external attachment-type type of vehicle.

As shown in FIG. 6, a gap 36 that is wide enough to insert a tool T such as a screwdriver that turns the aiming screw 30 from the front of the vehicle body is provided between the lower portion 3e of the lamp body 3 and a lower surface 32b of the vehicle body. A tool supporting portion 32c that protrudes upward is provided on the lower surface 32b, and a tool insertion through-hole 32d is provided directly below the second tool receiving portion 30f of the turning operation portion 30d, in the lower surface 32b. The supporting plate 29 is formed such that the first tool receiving portion 30e is exposed from the front of the vehicle body through the gap 36.

The aiming (tilting) of the lamp unit 2 will be described with reference to FIG. 6. The aiming adjustment is performed by placing the tip of a tool (a Phillips-head screwdriver in this case) that has been inserted from the gap 36 and supported by the tool supporting portion 32c against the first tool receiving portion 30e (beveled surface), or placing it against the second tool receiving portion 30f from below the turning operation portion 30d through the tool insertion through-hole 32d, and turning the tool T. When the optical axis adjusting portion 8, into which the aiming screw 30 that is turned is screwed, moves down as a result of turning the tool one way, the lamp unit 2 tilts around the horizontal tilt axis L2 and tilts upward, and when the optical axis adjusting portion 8 moves up as a result of turning the tool in the opposite direction, the lamp unit 2 tilts downward.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS

1 VEHICULAR LAMP
2 LAMP UNIT
3 LAMP BODY
3a, 3b REAR PORTION OF LAMP BODY
3c, 3d BOTH RIGHT-LEFT SIDE PORTIONS
4 FRONT COVER
5 LIGHT SOURCE
110 FIRST AIMING MECHANISM
120 SECOND AIMING MECHANISM
6, 7 FIRST VERTICAL TILT AXIS STRUCTURAL MEMBERS
8 OPTICAL AXIS ADJUSTING PORTION (DOUBLES AS BOTH THE FIRST AND SECOND AIMING MECHANISMS)
9, 10 SECOND VERTICAL TILT AXIS STRUCTURAL MEMBERS
11 VEHICLE BODY TO WHICH LAMP UNIT IS ATTACHED FROM THE FRONT
14 AIMING SCREW
19 BRACKET
14b TURNING OPERATION PORTION
14d BEVELED SURFACE AGAINST WHICH TOOL TIP IS ABUTTED FROM THE FRONT OR UNDERNEATH
30 AIMING SCREW
30d TURNING OPERATION PORTION
30e FIRST TOOL RECEIVING PORTION (FRONT ABUTTING TYPE)
30f SECOND TOOL RECEIVING PORTION (UNDERNEATH ABUTTING TYPE)
L1 FIRST HORIZONTAL TILT AXIS
L2 SECOND HORIZONTAL TILT AXIS
F FRONT OF VEHICLE BODY
R REAR OF VEHICLE BODY
Ri RIGHT SIDE OF VEHICLE BODY
Le LEFT SIDE OF VEHICLE BODY
T TOOL

What is claimed is:
1. A vehicular lamp comprising:
a lamp body;
a front cover integrated with the lamp body;
a lamp unit disposed within the lamp body and covered by the front cover;

a first aiming mechanism and a second aiming mechanism that enable the lamp unit to be assembled to a vehicle body from outside of the vehicle body or inside of the vehicle body, wherein the lamp body comprises:
- a pair of first vertical tilt axis structural members provided on a rear portion of the lamp body, and
- a pair of second vertical tilt axis structural members provided on both left and right sides of the lamp body,
- wherein the pair of first vertical tilt axis structural members engage with the vehicle body tiltably around a first horizontal tilt axis, and
- wherein the pair of second vertical tilt axis structural members are retained tiltably around a second horizontal tilt axis with respect to the vehicle body;

wherein the first aiming mechanism tilts the lamp unit around the first horizontal tilt axis; and the second aiming mechanism tilts the lamp unit around the second horizontal tilt axis.

2. The vehicular lamp according to claim 1, wherein the first aiming mechanism comprises a first optical axis adjusting portion that tilts the lamp unit around the first horizontal tilt axis by an aiming screw being interposed in between; and the second aiming mechanism comprises a second optical axis adjusting portion that tilts the lamp unit around the second horizontal tilt axis by an aiming screw being interposed in between.

3. The vehicular lamp according to claim 1, wherein the second vertical tilt axis structural members are tiltably retained by a bracket that is fixed to the vehicle body.

4. The vehicular lamp according to claim 1, wherein the second optical axis adjusting portion is formed able to be shared with the first optical axis adjusting portion.

5. The vehicular lamp according to claim 1, wherein the first optical axis adjusting portion or the second optical axis adjusting portion comprises a turning operation portion configured such that the aiming screw is able to be turned by a tool abutted therewith from the front of the vehicle body.

6. The vehicular lamp according to claim 1, wherein the turning operation portion has an underneath turning operation portion configured to be able to be turned by a tool abutted therewith from below the vehicle body.

7. The vehicular lamp according to claim 2, wherein the second vertical tilt axis structural members are tiltably retained by a bracket that is fixed to the vehicle body.

8. The vehicular lamp according to claim 2, wherein the second optical axis adjusting portion is formed able to be shared with the first optical axis adjusting portion.

9. The vehicular lamp according to claim 3, wherein the second optical axis adjusting portion is formed able to be shared with the first optical axis adjusting portion.

10. The vehicular lamp according to claim 2, wherein the first optical axis adjusting portion or the second optical axis adjusting portion comprises a turning operation portion configured such that the aiming screw is able to be turned by a tool abutted therewith from the front of the vehicle body.

11. The vehicular lamp according to claim 3, wherein the first optical axis adjusting portion or the second optical axis adjusting portion comprises a turning operation portion configured such that the aiming screw is able to be turned by a tool abutted therewith from the front of the vehicle body.

12. The vehicular lamp according to claim 4, wherein the first optical axis adjusting portion or the second optical axis adjusting portion comprises a turning operation portion configured such that the aiming screw is able to be turned by a tool abutted therewith from the front of the vehicle body.

13. The vehicular lamp according to claim 2, wherein the turning operation portion has an underneath turning operation portion configured to be able to be turned by a tool abutted therewith from below the vehicle body.

14. The vehicular lamp according to claim 3, wherein the turning operation portion has an underneath turning operation portion configured to be able to be turned by a tool abutted therewith from below the vehicle body.

15. The vehicular lamp according to claim 4, wherein the turning operation portion has an underneath turning operation portion configured to be able to be turned by a tool abutted therewith from below the vehicle body.

16. The vehicular lamp according to claim 5, wherein the turning operation portion has an underneath turning operation portion configured to be able to be turned by a tool abutted therewith from below the vehicle body.

17. A vehicular lamp comprising:
- a lamp body;
- a front cover integrated with the lamp body;
- a lamp unit disposed within the lamp body and covered by the front cover; and
- a first aiming mechanism and a second aiming mechanism that enable the lamp unit to be assembled to a vehicle body from outside of the vehicle body or inside of the vehicle body, wherein the lamp body comprises:
- a pair of first vertical tilt axis structural members provided on a rear portion of the lamp body, and
- a pair of second vertical tilt axis structural members provided on both left and right sides of the lamp body,
- wherein the pair of first vertical tilt axis structural members engage with the vehicle body tiltably around a first horizontal tilt axis, and
- wherein the pair of second vertical tilt axis structural members are retained tiltably around a second horizontal tilt axis with respect to the vehicle body;

wherein the first aiming mechanism comprises a first optical axis adjusting portion that tilts the lamp unit around a first horizontal tilt axis by an aiming screw being interposed in between;

wherein the second aiming mechanism comprises a second optical axis adjusting portion that tilts the lamp unit around the second horizontal tilt axis by an aiming screw being interposed in between;

wherein the second vertical tilt axis structural members are tiltably retained by a bracket that is fixed to the vehicle body;

wherein the second optical axis adjusting portion is formed able to be shared with the first optical axis adjusting portion;

wherein the first optical axis adjusting portion or the second optical axis adjusting portion comprises a turning operation portion configured such that the aiming screw is able to be turned by a tool abutted therewith from the front of the vehicle body; and wherein the turning operation portion has an underneath turning operation portion configured to be able to be turned by a tool abutted therewith from below the vehicle body.

18. A vehicular lamp comprising:
- a lamp body;
- a front cover integrated with the lamp body;
- a lamp unit disposed within the lamp body and covered by the front cover;
- an aiming mechanism that enable the lamp unit to be assembled to a vehicle body from outside of the vehicle body or inside of the vehicle body, wherein the lamp body comprises:
- a pair of first vertical tilt axis structural members provided on a rear portion of the lamp body, and
- a pair of second vertical tilt axis structural members provided on both left and right sides of the lamp body,
- wherein the pair of first vertical tilt axis structural members engage with the vehicle body tiltably around a first horizontal tilt axis, and
- wherein the pair of second vertical tilt axis structural members are retained tiltably around a second horizontal tilt axis with respect to the vehicle body;
- wherein the aiming mechanism tilts the lamp unit around choice between the first horizontal tilt axis and the second horizontal tilt axis.

19. The vehicular lamp according to claim 18, wherein the aiming mechanism comprises an optical axis adjusting portion that tilts the lamp unit around choice between the first horizontal tilt axis and the second horizontal tilt axis by an aiming screw being interposed in between.

* * * * *